(12) United States Patent
Garner

(10) Patent No.: US 11,463,781 B2
(45) Date of Patent: *Oct. 4, 2022

(54) SYSTEM OF CAPTURE AND SHARING OF MEDIA

(71) Applicant: ROKU, INC., San Jose, CA (US)

(72) Inventor: Gregory M. Garner, Springdale, AR (US)

(73) Assignee: ROKU, INC., Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/198,865

(22) Filed: Mar. 11, 2021

(65) Prior Publication Data

US 2021/0204034 A1 Jul. 1, 2021

Related U.S. Application Data

(63) Continuation of application No. 14/813,584, filed on Jul. 30, 2015, now Pat. No. 11,012,756.

(51) Int. Cl.
| | |
|---|---|
| *H04N 7/173* | (2011.01) |
| *H04N 21/63* | (2011.01) |
| *H04N 21/426* | (2011.01) |
| *H04N 21/462* | (2011.01) |
| *H04N 21/45* | (2011.01) |
| *H04N 21/4147* | (2011.01) |
| *H04N 21/61* | (2011.01) |
| *H04N 5/50* | (2006.01) |

(52) U.S. Cl.
CPC ............ *H04N 21/632* (2013.01); *H04N 5/50* (2013.01); *H04N 21/4147* (2013.01); *H04N 21/4263* (2013.01); *H04N 21/4524* (2013.01); *H04N 21/4622* (2013.01); *H04N 21/6143* (2013.01)

(58) Field of Classification Search
CPC .......... H04N 21/4331; H04N 21/5622; H04N 21/482
USPC ....................................... 725/25, 34, 28, 43
See application file for complete search history.

(56) References Cited

U.S. PATENT DOCUMENTS

2013/0024901 A1 * 1/2013 Sharif-Ahmadi ........................... H04N 21/43615
725/114

* cited by examiner

*Primary Examiner* — Jivka A Rabovianski
(74) *Attorney, Agent, or Firm* — Sterne, Kessler, Goldstein & Fox P.L.L.C.

(57) ABSTRACT

Disclosed herein are system, method, and computer program product embodiments for a system of capturing and sharing media. In an embodiment, a request for multimedia content is received from a requesting device comprising a tuner to which the requested multimedia content is unavailable. A first device of the plurality of devices to which the requested multimedia content is currently available is selected, the first device using a narrow band tuner tuned to the requested multimedia content. Access is provided to the requested multimedia content to the requesting device from the first device. It is determined that the narrow band tuner of the first device is changed from the requested multimedia content to different content. A second device of the plurality of devices to which the requested multimedia content is currently available is selected and access to the requested multimedia content is provided to the requesting device from the second device.

21 Claims, 7 Drawing Sheets

SYSTEM OF CAPTURE AND SHARING OF MEDIA

CROSS-REFERENCE TO RELATED APPLICATIONS

This application is a continuation of pending U.S. patent application Ser. No. 14/813,584 titled "Solid-State Capture of Broadcast Media", filed on Jul. 30, 2015 to Garner et al, which is herein incorporated by reference in its entirety.

BACKGROUND

Field

This disclosure is generally directed to the capture and sharing of media.

BACKGROUND

Television tuners receive a limited number of channels according to restrictions placed on a user's subscription service. The restrictions may determine to which channels or programs a user may subscribe and receive, and may vary based on which service provider the user is using as well as other reasons. As a result, different subscribers may not have access to certain desired channels or programs that not offered to them or otherwise not part of their subscription package. This lack of availability of certain channels and/or content can result in a loss of entertainment quality for users/subscribers, and loss of revenue and viewership for television service providers, channel operators, content producers, and advertisers.

SUMMARY

Provided herein are system, apparatus, article of manufacture, method, computer-readable medium, and/or computer program product embodiments, and/or combinations and sub-combinations thereof, for the system of capture and sharing media.

An embodiment includes a computer implemented method for the system of capture and sharing media. The method may operate by receiving a request for multimedia content from a requesting device comprising a tuner to which the requested multimedia content is unavailable. A plurality of devices to which the requested multimedia content is currently available are identified. A first device of the plurality of devices to which the requested multimedia content is currently available is selected, the first device using a narrow band tuner tuned to the requested multimedia content. Access is provided to the requested multimedia content to the requesting device from the first device. It is determined that the narrow band tuner of the first device is changed from the requested multimedia content to different content. A second device of the plurality of devices to which the requested multimedia content is currently available is selected and access to the requested multimedia content is provided to the requesting device from the second device.

Another embodiment includes a system for the system of capture and sharing media. The system may include at least one processor and a memory coupled to the at least one processor and configured to receive a request for multimedia content from a requesting device comprising a tuner to which the requested multimedia content is unavailable. A first device of the plurality of devices to which the requested multimedia content is currently available is selected, the first device using a narrow band tuner tuned to the requested multimedia content. A plurality of devices to which the requested multimedia content is currently available are identified. Access is provided to the requested multimedia content to the requesting device from the first device. It is determined that the narrow band tuner of the first device is changed from the requested multimedia content to different content. A second device of the plurality of devices to which the requested multimedia content is currently available is selected and access to the requested multimedia content is provided to the requesting device from the second device.

A further embodiment includes a non-transitory computer-readable medium having instructions stored thereon that, when executed by at least one computing device, causes the at least one computing device to perform operations. The operations may include receiving a request for multimedia content from a requesting device comprising a tuner to which the requested multimedia content is unavailable. A plurality of devices to which the requested multimedia content is currently available are identified. A first device of the plurality of devices to which the requested multimedia content is currently available is selected, the first device using a narrow band tuner tuned to the requested multimedia content. Access is provided to the requested multimedia content to the requesting device from the first device. It is determined that the narrow band tuner of the first device is changed from the requested multimedia content to different content. A second device of the plurality of devices to which the requested multimedia content is currently available is selected and access to the requested multimedia content is provided to the requesting device from the second device.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for the solid-state capture of broadcast media.

Figure 1:
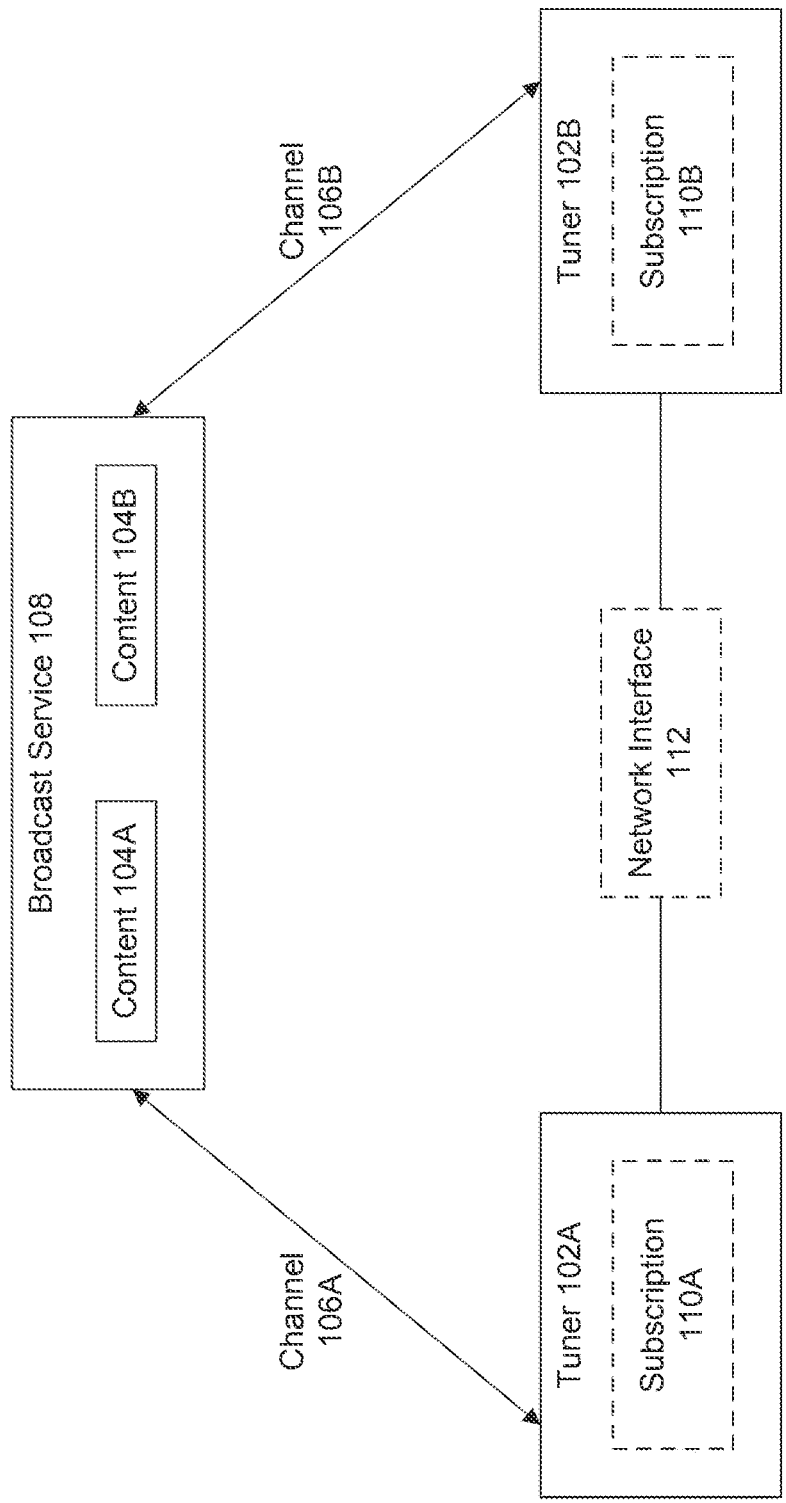
FIG. 1 is a block diagram of a system for the solid-state capture of broadcast media, according to an example embodiment.

FIG. 1 is a block diagram of a system 100 for the solid-state capture of broadcast media, according to an example embodiment.

Tuner 102 may be a video and/or audio tuner or other media receiver that is part of a television, computer, stereo, or other device that receives multimedia content 104. For example, tuner 102 may be a television tuner that receives television signals (e.g., from a broadcast service 108) that are displayed on a television, monitor, or other video/audio output device. Tuner 102 may be distinct from or part of the television, computer, stereo, etc.

Content 104A may be data received by tuner 102A and output as audio, video, and/or other media for a subscriber or other user. For example, tuner 102A may receive a stream of data packets of television content 104A (e.g., movies, sports, shows, music, etc.) from one or more channels 106A to which tuner 102A is subscribed (e.g., via subscription 110A) and/or to which tuner 102A is tuned.

Content 104A received at or by tuner 102A may be locally stored, buffered, or recorded for viewing (or other processing) at a later time and/or output in real-time (e.g., for viewing, listening, or other consumption/user by a subscriber) with or without local storage. For example tuner 102A may incorporate therein or be communicatively coupled to a box, such as a digital video recorder, where received content is stored for an extended period of time and/or buffered for shorter periods of time. Or, for example, the received content 104A may be stored on another network device, such as a home server or cloud computing storage account.

Figure 3A:
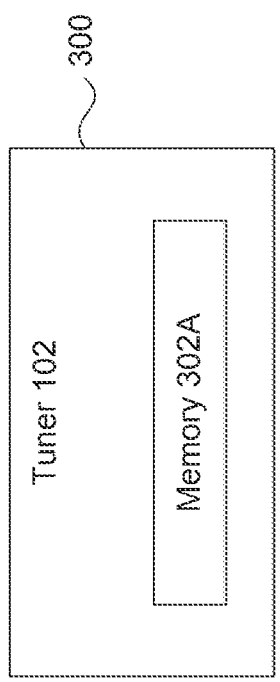
FIG. 3A is a block diagram of an example embodiment of a tuner and memory.

FIG. 3A is a block diagram 300 of an example embodiment of a tuner 102 and memory 302A. In the example of FIG. 3A, the tuner 102 and memory 302A may be part of the same device 300. The device 300 may include a cable box, satellite box, or other box or device configured to receive data via satellite, cable, and/or Internet connections. For example, device 300 may be affiliated with a streaming service and may receive data through a wired/wireless connection with a server or Internet-based service. Device 300 may, for example, receive communications or data over any wireless communications standards (e.g., Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.).

In an embodiment, memory 302 may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., USB memory, solid state drives SSD, etc.), and/or any other type of storage media configured for storing information.

Figure 3B:
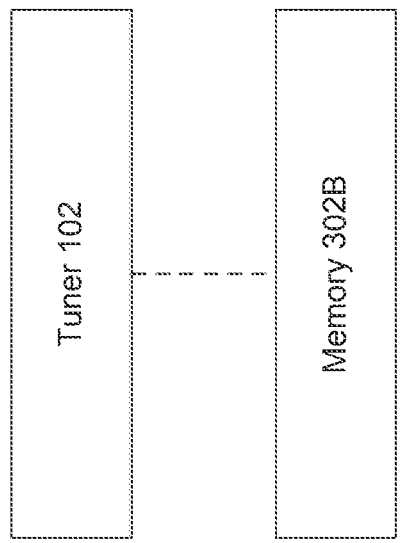
FIG. 3B is a block diagram of another example embodiment of a tuner and memory.

FIG. 3B is a block diagram 301 of an example embodiment of a tuner 102 and memory 302B. In the example of FIG. 3B, the tuner 102 and memory 302B may be communicatively coupled as parts of different devices. In an embodiment, a device associated tuner 102 may include a cable box, satellite box, or other box or device configured to receive data via satellite, cable, and/or Internet connections. For example, the device may be affiliated with a streaming service and may receive data through a wired/wireless connection with a server or Internet-based service.

Memory 302B may be memory that is coupled to another device or wirelessly accessible to tuner 102. For example, memory 302B may be part of a server associated with network interface 112, a local server associated with a subscriber's home or local geographic region, cloud storage, or any other wired/wirelessly accessible storage or memory 302B locations.

Returning to FIG. 1, in an embodiment, tuner 102A may have a subscription 110A that differs from a subscription 110B of another tuner 102B. For example, tuner 102A may be located in a first geographic area in which a particular channel 106A is available and is part of subscription 110A. Tuner 102B however may be located in a second geographic area, different or remote from the first area, in which the particular channel 106A is not available or otherwise not part of subscription 110B. Or, for example, the particular channel 106A may be offered by a first broadcast service 108 associated with subscription 110A, but not offered or available through a second broadcast service 108 associated with subscription 110B. For whatever reason, content 104A and/or channel 106A available at tuner 102A may not be available to the subscriber with tuner 102B and/or subscription 110B.

According to embodiments, however, system 100 may enable tuner 102B to access content 104A and/or the channel 106A that may have otherwise been unavailable to tuner 102B. In an embodiment, tuner 102A may be enabled to share, via a network interface 112 and/or other methodologies, content 104A and/or channel 106A to which tuner 102A has received or otherwise has access with one or more other tuners 102B.

Network interface 112 may be or may provide a network connection, including wired, wireless, direct, and/or indirect communication links, between two or more tuners 102. Network interface 112 may enable sharing and/or receipt of real-time, live, streamed, or stored content 104 (including channels 106) between tuners 102. For example, network interface 112 may enable tuner 102A to share content 104A received over one or more channels 106A with tuner 102B. As described herein, the shared content 104A and/or channels 106A may be received by tuner 102A and simultaneously or time-delayed shared with one or more other tuners 102B. In an embodiment, if channel 106A is shared with tuner 102B, then the corresponding content 104A may be re-directed from tuner 102A to tuner 102B.

Aspects of embodiments of the invention shall now be described in greater detail.

Tuners 102 may receive media, such as television or other multimedia, being transmit from one or more broadcast services 108. In an embodiment, tuners 102 may convert television transmissions (e.g., radio frequency, analog, or digital transmissions) into audio and/or video signals, which can be used to produce pictures, sound and/or other media on a subscriber's television, computer, stereo, DVD player, or other media capture/input/output device. A tuner 102 may receive content 104 as one or more packets of data via a satellite, cable, or other communication system. In other embodiments, a tuner 102 may receive different types of media, including but not limited to video and/or sound over the Internet, cellular, or other communications medium.

Tuners 102 may receive content 104 via one or more channels 106. Channels 106 may be television channels, radio channels, or other streaming/static service channels or frequency ranges/bands/internet addresses that provide or transmit content 104 that may be received by a tuner 102. In the example of Internet content, tuner 102 may include the ability of a device, such as a computer, mobile phone, or other computing device, to receive data packets via the Internet or other network.

In an embodiment, different channels 106 may provide varying types of content 104 directed to different subjects or interest areas. Example channels 106 may include national/international sports channels, local sports channels, team or sport specific sports channels, news channels, language specific channels, adult or child programming channels, local geographic channels (e.g., local to the geographic location of a tuner 102 or subscription zip code), cooking channels, history channels, nature channels, movie channels, or other channels.

Content 104 may include content or data that is streaming, real-time, or previously stored (e.g., either recorded locally at tuner 102A, or on-demand from broadcast service 108), or available through one or more servers through crowd sourcing (which is described in further detail below with respect to FIG. 4). Content 104 may include movies, sports, shows, music, or content of any other genre or type. Content 104 may include audio, video, and/or other multimedia that may be received by a tuner 102.

To receive a particular channel 106 and/or content 104, a tuner 102 may need to be associated with a subscription 110 to that channel 106 and/or content 104. Subscription 110 may indicate from which channels 106 tuner 102 is authorized to receive and/or share content 104. For example, subscription 110 may indicate which channels 106 and/or content 104 may be shared with other tuners 102 and/or to which tuners 102 the content 104/channels 106 may be shared. Or, for example, subscription 110 may include special authorization to receive particular content 104, such as pay-per-view movies, events, or other media. In an embodiment, different broadcast services 108 may provide different subscription packages from which a subscriber may choose which content 104 and/or channels 106 the subscriber desires to receive, have access, or share.

However, not all channels 106 (or particular content 104 associated with those channels 106) may be available to every tuner 102. There may be circumstances when a particular channel 106A is available to tuner 102A but unavailable to tuner 102B. Channels 106 may be available to certain subscriptions 110/tuners 102 and unavailable to other subscriptions 110/tuners 102 for any number of reasons. For example, the geographic area of a subscription 110/tuner 102 may determine which channels 106 are available. Or, for example, while a particular channel 106 may be available to two tuners 102, content 104A while available at tuner 102A may be blacked out or otherwise unavailable at tuner 102B (such as sporting events). Or tuner 102B may have difficulty receiving a stream of content 104A from broadcast server 108 (e.g., due to an outage), and desires to receive the subscribed content 104A from one or more other tuners 102A receiving content 104A and that may be accessible network interface 112.

Different broadcast services 108 may provide different channels 106 to different users for any different number of reasons. Certain channels 106 may be age restricted, or restricted to people who have membership in a particular social group or who may have subscribed to a particular subscription package 110. In an embodiment, different subscriptions 110 may have different costs depending on which channels 106, content 104, and/or broadcast services 108 are used, received, or otherwise made available or shared.

Broadcast service 108 may include a satellite-based, cable-based, or over the air based company that offers subscriptions to content 104 and/or one or more channels 106. The transmissions from a broadcast service 108 may be broadcast, multicast, simulcast, or unicast transmissions. In an embodiment, tuner 102A may receive content 104A from a first broadcast service 108, while tuner 102B receives content 104B from a second, different broadcast service 108. Broadcast service 108 may generate its own content corresponding to a specific grouping of one or more channels 106 or types of content 104 and/or may be a distributor of content 104/channels 106 from other content producers/providers. Payments received from subscribers may be apportioned amongst the various content producers, distributors, or other broadcast services 108.

In an embodiment, a subscriber may receive content 104 via a box or other device that includes a tuner 102 or is otherwise communicatively coupled to a tuner 102. Examples of such devices may include a cable box, DVD player, satellite receiver, modem, mobile phone, and computer. These boxes may include communication ports, memories, processors or other conventional computer components, including a wired/wireless/internal coupling to a tuner 102. For example, a broadcast service 108 may provide content 104 via an application installed or a device (e.g., computer or mobile phone), or via a website that is accessible over the Internet or other network. In an embodiment, tuner 102 may receive and/or share content 104/channels 106 through one or more applications installed on or otherwise accessible to (e.g., via the Internet) a device.

System 100 may allow two or more tuners 102 to share or crowd-source content 104 via network interface 112. Network interface 112 may be a peer-to-peer, subscription-based, or other network connection between two or more tuners 102 (e.g., tuner 102A and tuner 102B) that may or may not be affiliated with one or more broadcast services 108. Network interface 112 may enable tuners 102 to exchange and/or otherwise share stored and/or real-time content 104 received at or otherwise accessible to the respective tuners 102 with each other and other additional tuners 102 that may be part of a larger collaborative network 112.

In an embodiment, if a broadcast service 108 detects or is experiencing an outage is a particular area, the broadcast service 108 may direct the effected tuners 102B to received subscribed content over network interface 112 from one or more other subscribed tuners 102A. In an embodiment, the tuners 102A (e.g., subscribers associated with the tuners 102A) providing the requested content 104A may be compensated for providing this service to broadcast service 108 and/or tuners 102B.

In an embodiment, content 104A provided from one tuner 102A to another tuner 102B (either directly or indirectly) includes any commercials inserted into the content 104A by the broadcast service 108. In this manner, viewers of content 104A at the receiving tuner 102B are presented with such commercials. In an alternative embodiment, any such commercials are stripped from the content 104A when distributed to other tuners 102B and/or network interface 112. In an embodiment, network interface 112 may strip content 104A of commercials for an additional fee or upon request.

In various embodiments, tuners 102 may be either narrow-band or wide-band tuners. In an embodiment, one or more tuners 102 may be narrow-band and one or more tuners 102 may be wide-band and may share content 104 with one another.

In an embodiment, tuner 102A may be a narrow-band tuner set to a particular channel 106A. A narrow-band tuner may allow a particular tuner 102A to receive content 104 over a limited number of channels 106 (including only a single channel 106) of a subscription 110. Then for example, tuner 102A may receive content 104A from channel 106A and one or more other channels within a limited frequency band of channel 106A or other selection by a subscriber of one or more channels 106. A narrow-band tuner may be limited in the amount of bandwidth it has available or accessible to receive content 104 or other data, or may otherwise limit from how many channels 106 it may receive content 104 simultaneously.

If tuner 102A is a narrow-band tuner, tuner 102A may need to be tuned to a particular channel 106 to receive, have access to, and/or otherwise share content 104A associated with that channel 106. For example, content 104A may be a sports game unavailable to tuner 102B that a subscriber at tuner 102B desires to view in real-time. Then for example, tuner 102B may request to view the game via network interface 112. Tuner 102B may be connected with or send a connection request to tuner 102A to view the requested game. For the duration of the game, tuner 102A may need to be tuned to the channel 106 on which the game is being played for tuner 102B to receive the requested content 104.

If tuner 102A is disconnected from the channel 106 on which the game is being played, then network interface 112 may automatically connect tuner 102B with a different tuner 102 that may be tuned to the game and is willing or authorized (e.g., by broadcast service 108) to share content 104. Or, for example, tuner 102B may request access to another tuner 102 that has access to the requested game.

In an embodiment, there may be a handshake or other agreement between a subscriber with tuner 102A and a subscriber with tuner 102B that tuner 102A shall remain tuned to the game for the duration of the game or until a request for the game is cancelled. The agreement may be a social agreement, or a contract with monetary payment made between the subscribers and/or broadcast server 108, which may or may not be legally binding. In an embodiment, tuner 102A may not be changed from the shared channel 106A if such an agreement is reached for a period of time or until the end of a program or other termination of the agreement.

If, however, tuner 102A is a wide-band tuner, then tuner 102A may be capable of receiving the game content 104 regardless of which channel 106 tuner 102A may be tuned or directed during the game. Then for example, tuner 102B may receive the game from tuner 102A regardless of to which channel 106 tuner 102A is tuned, so long as tuner 102A continues to receive signals from broadcast service 108 and maintains a connection to network interface 112.

Wide-band tuners 102 may be able to receive content 104 from more channels 106 than may be received by a narrow-band tuner. In an embodiment, if tuner 102A is a wide-band tuner, tuner 102A may receive from all channels 106 (or more channels 106 than may be available with a narrow-band tuner) that are part of subscription 110A simultaneously. This access to content 104 from all channels 106 via wide-band tuner 102A may allow a subscriber (e.g., associated with tuner 102A receiving the content 104A various viewing options for watching and/or sharing television content.

When using wide-band tuner 102A, there may or may not be sharing of content 104 with additional tuners 102B. For example, any tuner 102 that has access to wide-band content 104A (e.g., as received from wide-band tuner 102A), either from direct receipt or sharing as described herein, may have many more options on how they may view content 104A (versus the limited amount of content that may be accessible from a narrow-band tuner).

For example, a subscriber with access to wide-band content 104 may view any number of channels 106 simultaneously on a television. In an embodiment, the screen of the television may be subdivided to allow the user to view sixteen channels 106 simultaneously, with the subscriber having the option to change the sizes of the viewing area of each channel 106. Or, for example, a subscriber may time-shift their viewing options, to watch all available channels 106 as they may have been stored on a previous day as if they are watching live television. In an embodiment, tuner 102B may receive content 104 from two or more channels from a single tuner 102A simultaneously.

In an embodiment, network interface 112 may include a menu or other visual interface accessible to subscribers with tuners 102 connected via network interface 112. The visual interface may enable subscribers to request particular content 104 and/or channels 106 at specified intervals from any of a number of tuners 102. For example, the visual interface may enable two tuners 102 to establish a peer-to-peer connection to share content 104. Or, for example, network interface 112 may include a server that receives requested content 104 from one or more tuners 102 and makes that content 104 available or otherwise transmits that content 104 to one or more tuners 102 that have requested the content 104.

In an embodiment, the visual interface may include information about potential connection partners to that the subscribers may determine with whom they desire to establish a connection or otherwise share content 104. Such information may include user name, location, subscription information (e.g., available channels 106 and/or content 104), availability, age, connection speed, connection/sharing history, cost, ratings of content 104, channels 106, and/or subscribers, user comments, etc. In an embodiment, network interface 112 may enable a first tuner 102B to mirror a second tuner 102A, such that every channel 106 and/or content 104 being viewed or to which tuner 102A is tuned is received by tuner 102B. This may be useful, for example, if a parent at work wishes to view on his/her computer the content 104 being viewed by a child at home. In an embodiment, this option may be available only to users having administrative or owner access to the originating tuner 102 (i.e., the tuner being mirrored).

In an embodiment, network interface 112 may provide a subscriber who shares content 104 with incentives such as payments, discounts, or credits that may be used to receive content 104 from other subscribers or subscribe to additional channels 106 and/or content 104. Correspondingly, or alternatively, those requesting content 104 from another tuner 102 may be charged a fee associated with accessing the requested content 104.

Figure 2:
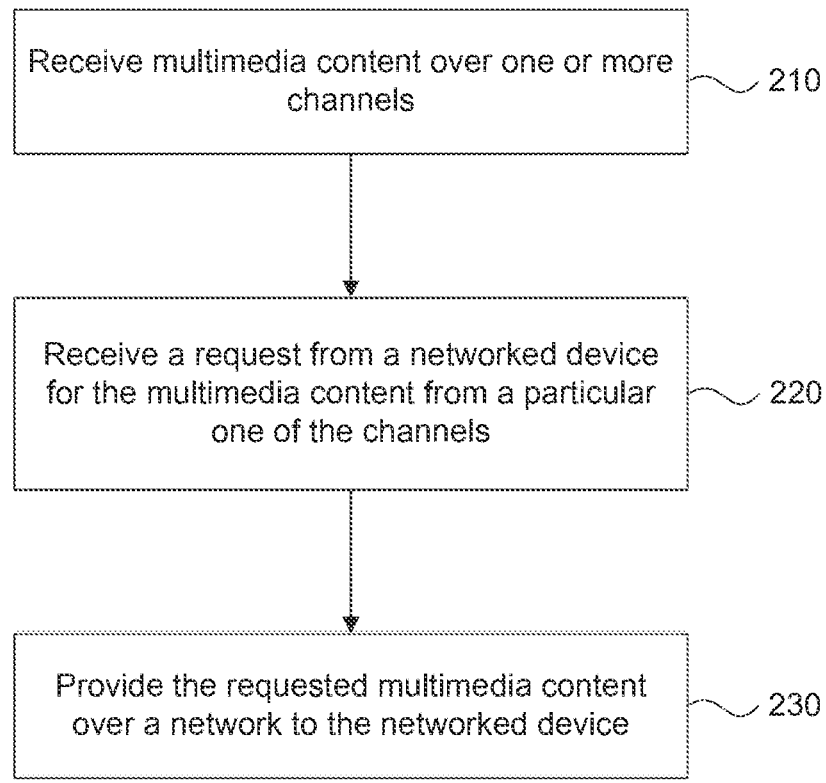
FIG. 2 is a flowchart for a method for the solid-state capture of broadcast media, according to an embodiment.

FIG. 2 is a flowchart for a method 200 for the solid-state capture of broadcast media, according to an embodiment. Method 200 can be performed by processing logic that can comprise hardware (e.g., circuitry, dedicated logic, programmable logic, microcode, etc.), software (e.g., instructions running on a processing device), or a combination thereof.

In step 210, multimedia content is received by a first tuner over one or more channels. For example, tuner 102A may receive content 104A over one or more channels 106A. Content 104A may be received over a narrow-band or wide-band tuner.

In step 220, a request from a networked device for the multimedia content from a particular one of the channels is received. For example, tuner 102A may receive a request via network interface 112 that the received content 104A is requested by tuner 102B. Or, for example, tuner 102A may upload or otherwise indicate via network interface 112 which received content 104 and/or channels 106 are available to other users/subscribers of network interface 112. Tuner 102A may restrict to which other tuners 102B received or subscribed content 104/channels 106 is provided. For example, tuner 102A may restrict access to tuners 102 within a particular geographic area, with a minimum specified connection speed, subscribers of a certain age, or to subscribers willing to pay a fee specified by a subscriber associated accessing the content 104 from tuner 102A.

In an embodiment, tuner 102B (requesting content 104A) may be a networked device that is unable to receive content from broadcast service 108. For example, tuner 102A may be part of a television that receives a satellite broadcast signal for display on the television, while tuner 102B is a computer that is unable to receive the satellite broadcast signal, but is nonetheless able to communicate with and receive/share content 104 from tuner 102A via network interface 112. For example, if tuner 102B is a computer that has downloaded playable content 104, that content 104 may be shared via network interface 112 with tuner 102A.

In step 230, the requested multimedia content is provided over a network to the networked device. For example, network interface 112 may include a peer-to-peer or other networked connection by which tuner 102A may provide or otherwise make available the requested content 104A or a portion thereof to tuner 102B. In an embodiment, tuner 102B may simultaneously or consecutively receive portions of the requested content 104A from a plurality of tuners 102. Then for example, if one of the tuners 102 goes off line or otherwise no longer provides the requested content 104, the viewing experience or receipt of requested content by tuner 102B would not be interrupted.

In an embodiment, tuner 102B may receive a first portion of the requested content 104 from tuner 102A. Then, for example, if the requested content 104 is not real-time or live content, tuner 102B may receive and buffer a second portion of the requested content 104 from a different tuner 102 (not shown), while the first portion is being received and/or displayed for the subscriber of tuner 102B.

Figure 4:
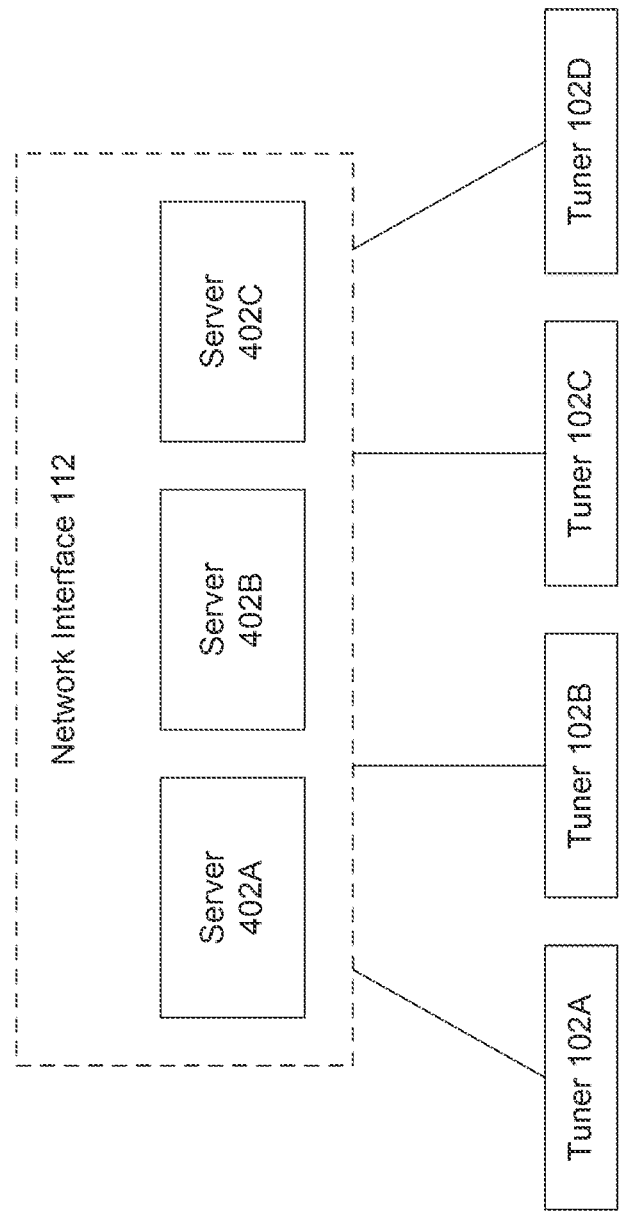
FIG. 4 is a block diagram of a system for the solid-state capture of broadcast media, according to another example embodiment.

FIG. 4 is a block diagram 400 of a system for the solid-state capture of broadcast media, according to another example embodiment.

In the example of FIG. 4, multiple tuners 102A-D may simultaneously crowd-source, request, and/or otherwise share content 104 via network interface 112. For example, tuners 102A and 102C may provide content 104 to network interface 112 from their respective subscriptions.

This content may be stored across one or more servers 402A-C. Servers 402 may receive, distribute, and store content and provide additional functionality to tuners 102. Servers may include memory components (302B) to store content received from tuners 102. In an embodiment, one or more servers 402 may be configured to receive content, one or more servers 402 may be configured to process received content 104, and one or more servers 402 may be configured to share received and/or processed content 104. Or, servers 402 may be multi-functioned servers configured to perform any necessary functions including, but not limited to receiving, processing, and sharing content 104.

In an embodiment, network interface 112 may receive the same content 104 for two or more tuners 102 provided for redundancy and increased quality of received content 104. Then, for example, if one of the providing tuners 102 loses a connection to network interface 112, network interface 112 may nonetheless continue to receive content from one or more other tuners 102. Or, for example, if received content 104 from a first tuner 102A is determined to be of low quality, that portion of content may be used from a different tuner 102C that is determined to be of higher quality. In an embodiment, any particular or multiple tuners 102 may share and receive content via network interface 112 simultaneously.

Figure 5:
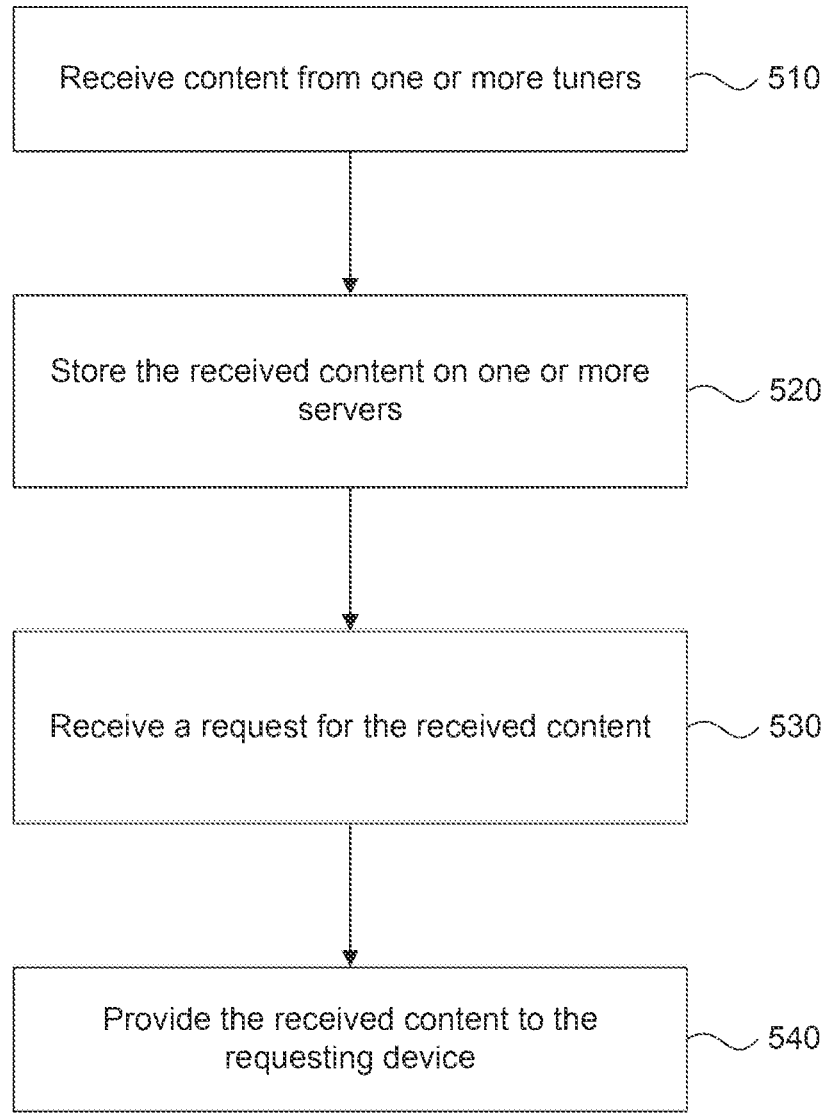
FIG. 5 is a flowchart for a method for the solid-state capture of broadcast media, according to another example embodiment.

FIG. 5 is a flowchart 500 for a method for the solid-state capture of broadcast media, according to another example embodiment. Method 200 can be performed by processing logic that can comprise hardware (e.g., circuitry, dedicated logic, programmable logic, microcode, etc.), software (e.g., instructions running on a processing device), or a combination thereof.

In step 510, multimedia content is received from one or more tuners. For example, server 402A may receive content 104 from tuners 102A and 102D. The received content 104 may include similar or duplicative content 104 from tuners 102, or different content 104. If duplicative content 104 is received, only the highest quality content 104 may be retained for sharing.

In step 520, the received content may be stored on one or more servers. For example, the received content may be stored in memories across any of the servers 402. This may allow, for example, network interface 112 to crowd-source content 104 from across multiple devices (e.g., tuners 102) providing the greatest quality, availability, and breadth of content. And may further allow the sharing of content 104 to many tuners 102 simultaneously.

In step 530, a request for the received content is received. For example, network interface 112 may receive at one or more servers 402 requests from one or more tuners 102B and 102C for content that is being received, has been received, or will or may be received (e.g., for future programming). In an embodiment, the request for received content 104 may be received before the corresponding content 104 is received.

In step 540, the received content may be provided to the requesting device. For example, one or more servers 402 may receive and process requests for data from the tuners 102A-D. If the request was for future-programming or other programming currently unavailable, the content 104 may be provided responsive to the request when it is received and available for sharing.

Figure 6:
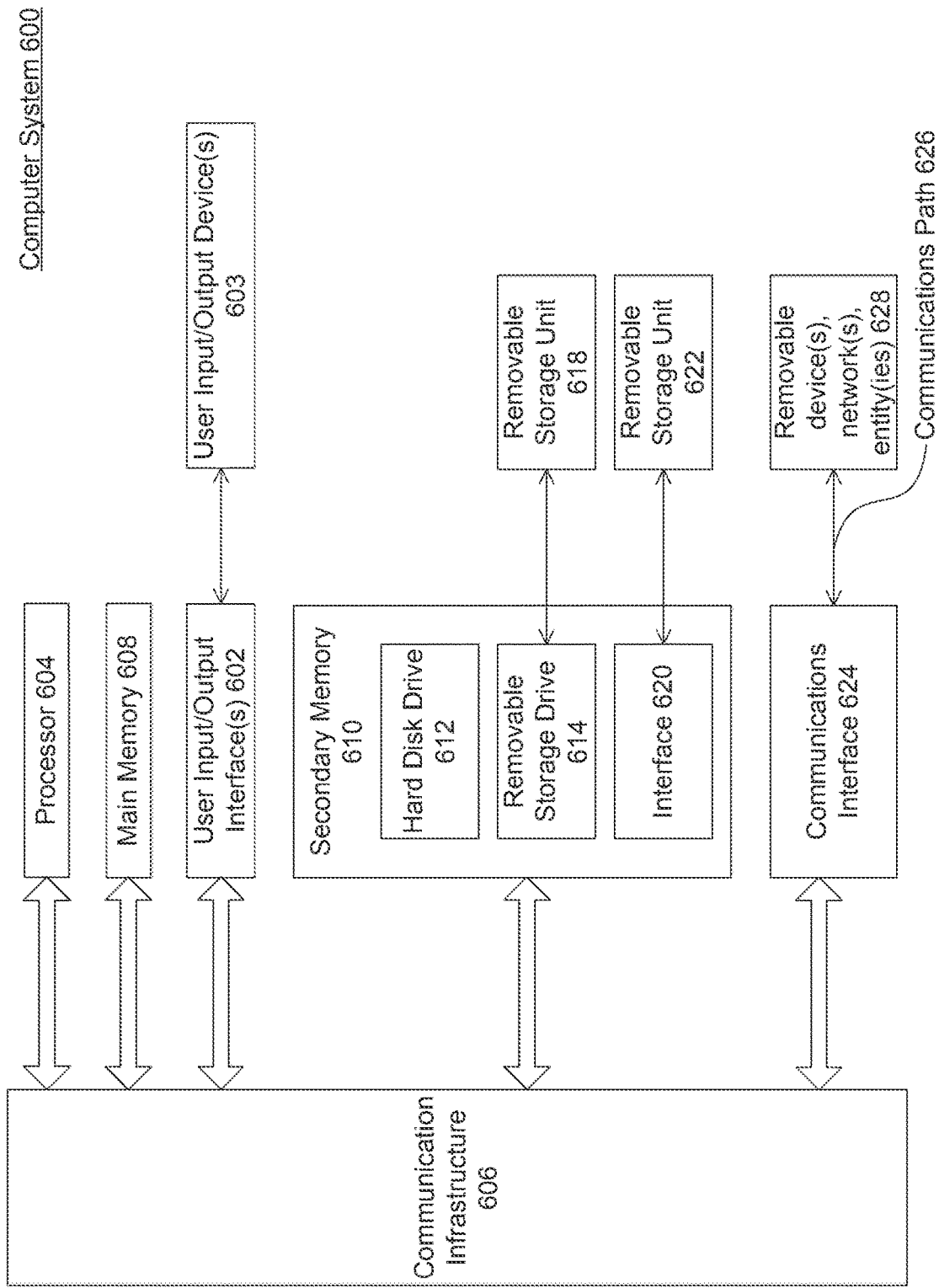
FIG. 6 is an example computer system useful for implementing various embodiments.

Various embodiments can be implemented, for example, using one or more well-known computer systems, such as computer system 600 shown in FIG. 6. Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method, comprising:
    receiving a request for multimedia content from a requesting device comprising a tuner, wherein the requested multimedia content is unavailable to the tuner of the requesting device;
    identifying a plurality of devices to which the requested multimedia content is currently available;
    selecting a first device of the plurality of devices to which the requested multimedia content is currently available, wherein the first device is configured to access the requested multimedia content using a narrow band tuner tuned to the requested multimedia content;
    providing access to the requested multimedia content to the requesting device from the first device;
    determining that the narrow band tuner of the first device is changed from the requested multimedia content to different content;
    selecting a second device of the plurality of devices to which the requested multimedia content is currently available; and providing access to the requested multimedia content to the requesting device from the second device.

2. The method of claim 1, wherein the tuner of the requesting device comprises a wide band tuner, and wherein the requested multimedia content is unavailable to any of a plurality of frequencies accessible to the wide band tuner.

3. The method of claim 1, wherein the second device includes a wide band tuner configured to receive both the requested multimedia content and one or more other contents simultaneously.

4. The method of claim 1, further comprising:
stripping commercials from the requested multimedia content before providing access to the requested multimedia content from either the first device or the second device, wherein the requesting device receives the requested multimedia content without the commercials.

5. The method of claim 1, wherein both the first device and the second device are associated with a subscription to a particular channel associated with the requested multimedia content, and wherein the requesting device is not associated with the subscription to the particular channel.

6. The method of claim 1, wherein the selecting the second device of the plurality of devices comprises:
providing a user interface comprising a plurality of user names associated with the plurality of devices to which the requested multimedia content is currently available; and
receiving a selection of one of the plurality of user names, wherein the selected user name corresponds to the second device.

7. The method of claim 1, wherein the requested multimedia content comprises live streaming content.

8. A system, comprising:
a memory; and
at least one processor coupled to the memory and configured to perform operations comprising:
receiving a request for multimedia content from a requesting device comprising a tuner, wherein the requested multimedia content is unavailable to the tuner of the requesting device;
identifying a plurality of devices to which the requested multimedia content is currently available;
selecting a first device of the plurality of devices to which the requested multimedia content is currently available, wherein the first device is configured to access the requested multimedia content using a narrow band tuner tuned to the requested multimedia content;
providing access to the requested multimedia content to the requesting device from the first device;
determining that the narrow band tuner of the first device is changed from the requested multimedia content to different content;
selecting a second device of the plurality of devices to which the requested multimedia content is currently available; and
providing access to the requested multimedia content to the requesting device from the second device.

9. The system of claim 8, wherein the tuner of the requesting device comprises a wide band tuner, and wherein the requested multimedia content is unavailable to any of a plurality of frequencies accessible to the wide band tuner.

10. The system of claim 8, wherein the second device includes a wide band tuner configured to receive both the requested multimedia content and one or more other contents simultaneously.

11. The system of claim 8, the operations further comprising:
stripping commercials from the requested multimedia content before providing access to the requested multimedia content from either the first device or the second device, wherein the requesting device receives the requested multimedia content without the commercials.

12. The system of claim 8, wherein both the first device and the second device are associated with a subscription to a particular channel associated with the requested multimedia content, and wherein the requesting device is not associated with the subscription to the particular channel.

13. The system of claim 8, wherein the selecting the second device of the plurality of devices comprises:
providing a user interface comprising a plurality of user names associated with the plurality of devices to which the requested multimedia content is currently available; and
receiving a selection of one of the plurality of user names, wherein the selected user name corresponds to the second device.

14. The system of claim 8, wherein the requested multimedia content comprises live streaming content.

15. A non-transitory computer-readable medium having instructions stored thereon that, when executed by at least one computing device, cause the at least one computing device to perform operations comprising:
receiving a request for multimedia content from a requesting device comprising a tuner, wherein the requested multimedia content is unavailable to the tuner of the requesting device;
identifying a plurality of devices to which the requested multimedia content is currently available;
selecting a first device of the plurality of devices to which the requested multimedia content is currently available, wherein the first device is configured to access the requested multimedia content using a narrow band tuner tuned to the requested multimedia content;
providing access to the requested multimedia content to the requesting device from the first device;
determining that the narrow band tuner of the first device is changed froth the requested multimedia content to different content;
selecting a second device of the plurality of devices to which the requested multimedia content is currently available; and
automatically providing access to the requested multimedia content to the requesting device.

16. The non-transitory computer-readable medium of claim 15, wherein the tuner of the requesting device comprises a wide band tuner, and wherein the requested multimedia content is unavailable to any of a plurality of frequencies accessible to the wide band tuner.

17. The non-transitory computer-readable medium of claim 15, wherein the second device includes a wide band tuner configured to receive both the requested multimedia content and one or more other contents simultaneously.

18. The non-transitory computer-readable medium of claim 15, the operations further comprising:
stripping commercials from the requested multimedia content before providing access to the requested multimedia content from either the first device or the second device, wherein the requesting device receives the requested multimedia content without the commercials.

19. The non-transitory computer-readable medium of claim 15, wherein both the first device and the second device are associated with a subscription to a particular channel associated with the requested multimedia content, and wherein the requesting device is not associated with the subscription to the particular channel.

20. The non-transitory computer-readable medium of claim 15, wherein the selecting the second device of the plurality of devices comprises:

providing a user interface comprising a plurality of user names associated with the plurality of devices to which the requested multimedia content is currently available; and receiving a selection of one of the plurality of user names, wherein the selected user name corresponds to the second device.

21. The method of claim 1, wherein the selecting the second device of the plurality of devices comprises:

selecting the second device of the plurality of devices, to which the requested multimedia content is currently available, responsive to the determination that the narrow band tuner of the first device is changed from the requested multimedia content to different content.

\* \* \* \* \*